United States Patent
Holmes

(10) Patent No.: US 7,847,227 B2
(45) Date of Patent: Dec. 7, 2010

(54) OPTICAL MEASURING SYSTEM

(75) Inventor: Melanie Holmes, Woodbridge (GB)

(73) Assignee: Thomas Swan and Co. Ltd., Durham (GB)

( * ) Notice: Subject to any disclaimer, the term of this patent is extended or adjusted under 35 U.S.C. 154(b) by 344 days.

(21) Appl. No.: 11/978,471

(22) Filed: Oct. 29, 2007

(65) Prior Publication Data

US 2008/0265150 A1    Oct. 30, 2008

Related U.S. Application Data

(62) Division of application No. 10/582,254, filed on Nov. 10, 2006, now Pat. No. 7,442,909.

(51) Int. Cl.
*G01J 1/20* (2006.01)
*G03H 1/12* (2006.01)
*H04N 5/89* (2006.01)

(52) U.S. Cl. ............... 250/201.9; 359/11; 348/40

(58) Field of Classification Search ... 250/201.1–201.9, 250/216, 208.1, 221; 385/48; 359/10, 11, 359/35, 9, 15, 32; 348/40, 135
See application file for complete search history.

(56) References Cited

U.S. PATENT DOCUMENTS

| | | | | |
|---|---|---|---|---|
| 5,719,650 A | * | 2/1998 | Wefers et al. | 349/74 |
| 6,570,143 B1 | | 5/2003 | Neil et al. | 250/201.9 |
| 7,442,909 B2 | * | 10/2008 | Holmes | 250/201.9 |
| 2002/0146206 A1 | * | 10/2002 | Aleksoff | 385/48 |

OTHER PUBLICATIONS

Voronstov, et al., "Advanced phase-contrast techniques for wavefront sensing and adaptive optics", Proceedings of the SPIE, vol. 4124, 2000. pp. 98-109.
Crossland, et al., "Holographic Optical Switching: The "Roses" Demonstrator", Journal of Lightwave Technology, vol. 18, No. 12, Dec. 2000 pp. 1845-1854.

* cited by examiner

*Primary Examiner*—Georgia Y Epps
*Assistant Examiner*—Don Williams
(74) *Attorney, Agent, or Firm*—Allston L. Jones; Peters Verny, LLP

(57) ABSTRACT

Apparatus and methods are described for measuring amplitude and phase variations in a spatially coherent beam of light. A beam of coherent light is made incident upon a spatial array of phase modulating elements displaying a pixellated first phase distribution. In a measuring region of said spatial array, the phase distribution is changed to a new value while retaining the first phase distribution outside the measuring region, for example by flashing a single pixel. The change in intensity resulting from the change in phase distribution is then determined.

21 Claims, 6 Drawing Sheets

OPTICAL MEASURING SYSTEM

CROSS REFERENCE

This application is a Divisional Application of Application having Ser. No. 10/582,254 filed Nov. 10, 2006 as a PCT National Phase Application claiming priority from PCT/GB2004/005182 having an International filing date of 9 Dec. 2004 which in turn claims priority from UK patent application GB0328904.8 filed 12 Dec. 2003.

The present invention relates to a method of measuring amplitude and phase variations within a spatially coherent beam of light, to a method of characterising a spatially coherent beam of light, to apparatus for measuring amplitude and phase variations in a spatially coherent beam of light, and to apparatus for characterising a spatially coherent beam of light.

In many optical systems throughput efficiency, crosstalk and noise level depend on the alignment of the various components with respect to one another and to the optical beams passing through. An important problem during assembly of many free space optical systems is that the beam is not visible and its properties cannot be measured as it is incident on the various components in the system, except where the component happens to be a detector array. Even with a detector array measurements are restricted to the intensity when it is the phase distribution that would be more usefully measured.

Usually measurements are confined to overall coupling efficiency into the intended output or some intermediate output.

The more components there are to adjust the more variables there are to optimise, and working "blind" the whole procedure can be very time consuming and expensive. A further problem is that the beams in a real optical system, although maybe Gaussian-like in theory, often have sidelobes due to aberrations, especially when lenses are misaligned A search for a global optimum can lead to an apparent optimum alignment that instead results in a sidelobe being coupled into the output, rather than the main peak. The existence of such subsidiary maxima makes it more difficult to optimise the alignment.

Often the components themselves are not ideal. For example lenses have a tolerance in dimensions and focal length that makes pick and place assembly inappropriate, while angle-polished fibres have a tolerance in the polish angle. As a result the relative longitudinal spacing, transverse offset and tilt of an optical fibre and lens may need to be adjusted to suit the properties of that lens and fibre. The relative orientation of the lens-fibre assembly may need to be adapted to the rest of the system.

Liquid Crystal over Silicon spatial light modulators (LCOS SLM) are devices having an array of elements each capable of applying a controllable phase change to light incident upon the element. LCOS SLMs may be used for applying phase modulation to incident light beams, and may be one dimensional or often 2 dimensional. LCOS SLMs may be used to carry out many optical processing functions such as correlation, monitoring a beam by tapping off a small fraction of the incident energy, routing a beam, changing a beam focus, aberration correction, changing a beam shape or changing the power carried by a beam. Each element of an LCOS SLM is sometimes referred to as a pixel, even though it does not carry picture information; in this document the term "pixel" signifies phase modulating element.

The dimensions of the pixels of the SLM may be selected according to the application to which the SLM is to be put when in use in the optical system (as opposed to when calibration/set-up/characterisation is taking place). In a wavelength routing/beam steering application, the pixel might be between 5 um and 15 um, and in this case beams might have a spot size of a few 10's of ums (e.g. 50) to say 250 um.

In an embodiment, the size of the array per beam has a width of around 3 times the spot size, and height a little smaller. Typically at least 100 pixels are needed for hologram display.

Where low loss is important, for example where the SLM is to function as a controllable alignment mirror, the pixel size may be selected to be between 20 um sq and 40 um sq. Here a beam spot radius could be 1 or 2 mm.

A number of known devices and methods for characterising wavefronts exist. Some of these require intensive computation and/or two dimensional detector devices capable in themselves of simultaneously determining the spatial variation in detected light.

The present invention is advantageous in having embodiments that are capable of using only a point detector, rather than one which provides data indicative of the spatial distribution of light, and embodiments that use binary SLMs.

Embodiments of the invention are aimed at providing an ability to assist with the alignment problems mentioned above by enabling a more complete characterisation of beams in an optical system. The invention is however not restricted to this area.

According to one aspect of the invention there is provided a method of measuring amplitude and phase variations in a spatially coherent beam of light comprising causing the beam to be incident upon a spatial array displaying a pixelated first phase distribution, in a measuring region of said spatial array causing the phase distribution to assume a new value while retaining the first phase distribution outside the measuring region, in the Fourier plane determining the change in intensity resulting from the change in phase distribution.

According to another aspect of the invention there is provided a method of characterising a spatially coherent beam of light, comprising disposing a LCOS SLM in the path of the beam; causing the LCOS SLM to display a first hologram pattern; at a location in said beam where the amplitude and phase of the beam are to be characterised, changing the hologram pattern to a second hologram pattern; and measuring the effect of said change by measuring an intensity.

In an embodiment, the output from the SLM is measured in the Fourier plane to detect the Fourier output.

In an embodiment, the method comprises measuring the intensity in a region of the Fourier plane where $F_0(x,y)$ is very weak but $g(x,y)$ is relatively stronger, varying the position on the SLM where the perturbation is applied to form a set of measurements of $(g(x,y)f(u_0,v_0))^2$ taking the square root of these measurements to derive values for the relative field amplitude at these positions.

In an embodiment, the method comprises stepping through a sequence of phase distributions.

In an embodiment, the method comprises varying the phase shift in a respective single pixel.

According to another aspect of the invention there is provided apparatus for measuring amplitude and phase variations in a spatially coherent beam of light, the apparatus comprising a pixelated spatial array, each pixel being controllable to apply any of plural phase shifts to input light, whereby the array displays a desired distribution of phase modulation, means for causing the array to display a first selected distribution of phase modulation; means for changing the first distribution in a measuring region of said spatial array to assume a new distribution while retaining the first phase distribution outside the measuring region, means disposed in the Fourier plane for determining a change in intensity of light resulting from the change in phase distribution.

According to a further aspect of the invention there is provided apparatus for characterising a spatially coherent beam of light, comprising a LCOS SLM arranged so that a said beam of light can be incident upon it; means for causing the LCOS SLM to display a first hologram pattern; means for changing the hologram pattern to a second hologram pattern at a location in said beam where the amplitude and phase of the beam are to be characterised; and means for measuring an intensity of light to determine the effect of said change of hologram pattern.

In an embodiment, the means for measuring is disposed in the Fourier plane to detect the Fourier output.

In an embodiment, the apparatus further comprises a lens for providing the Fourier output.

In an embodiment, the apparatus further comprises a mirror for providing the Fourier output.

An example embodiment of the invention will now be described with reference to the following drawings, in which.

Figure 1:
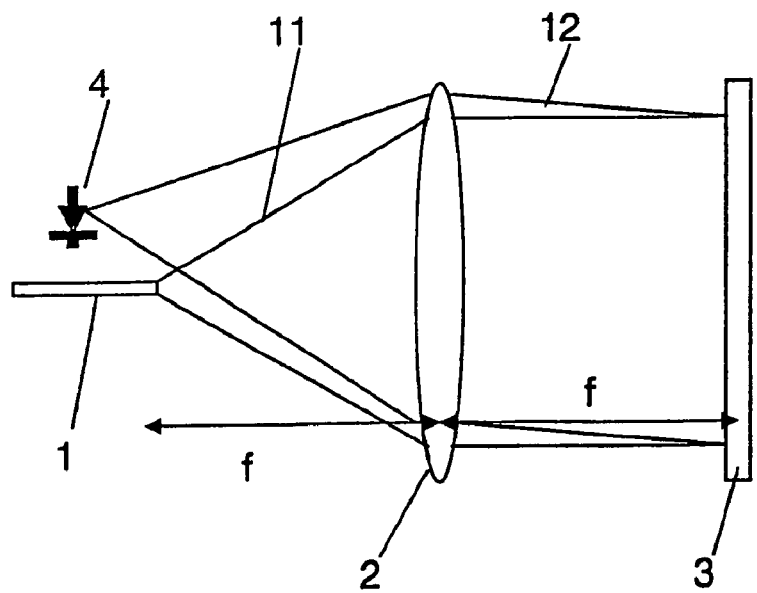
FIG. 1 shows a diagram of a set up of apparatus embodying the invention.

Referring to FIG. 1, an input fibre 1 is disposed at the focal point of a lens 2, and an LCOS SLM 3 is disposed in the opposite focal plane. Light from the fibre 1 passes to the lens 2 and onto the SLM 3, which displays a hologram pattern on its pixels so as to cause reflected light 12 to be deviated by an angle θ. A photodiode 4 is shown at the position where this light 12 is focussed by the lens 2. In practice the system may include a beam splitter to allow the disposition of the photodiode 4.

Figure 2:
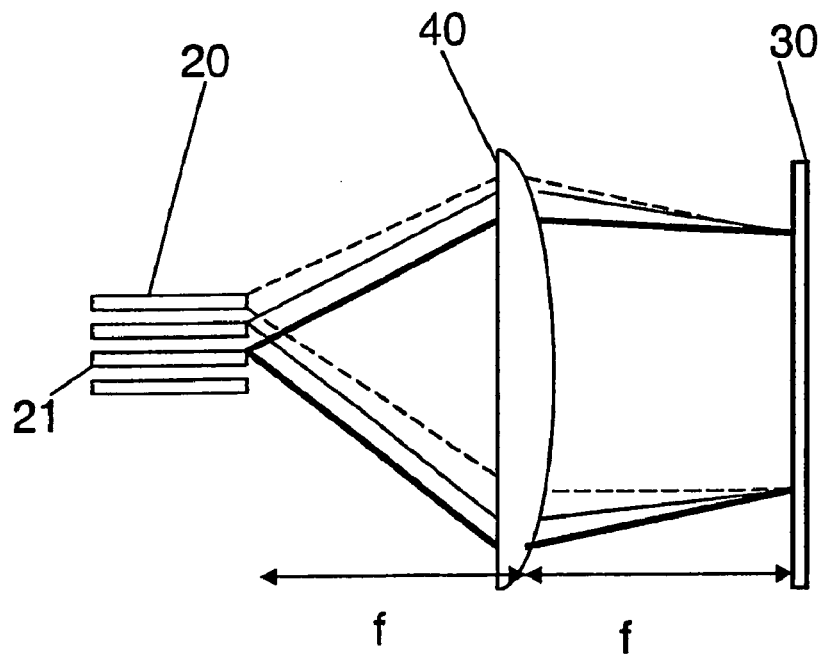
FIG. 2 shows a diagram of a second apparatus embodying the invention.

Referring to FIG. 2, an arrangement is shown with a 1-D reflective phase-modulating FLC SLM with 540 pixels. The arrangement is a 2-f system with a Fourier lens, and further comprises a silica-on-silicon waveguide array allowing light to be input and extracted.

A 2-D SLM may be used instead of a 1-D SLM. Use of a reflective SLM is not fundamental to the invention. Transmissive LCOS SLMs may however impart phase variations due to varying silicon thicknesses across the SLM.

Let (u,v) be the co-ordinate system at the SLM and let the spatially coherent incident beam be f(u,v) exp i φ(u,v) where f(u,v) describes the amplitude and φ(u,v) describes the phase. As an example the incident field could be an off-axis normally incident defocused Gaussian beam. For this example, the incident beam may be described by equation (1):

$$f(u,v) = \exp-\left\{\frac{(u-u_{INC})^2 + (v-v_{INC})^2}{\omega^2}\right\} \quad (1)$$

$$\exp i\phi(u,v) = \exp-ik\left\{\frac{(u-u_{INC})^2 + (v-v_{INC})^2}{2R}\right\}$$

where $u_{INC}$ and $v_{INC}$ are the co-ordinates at the centre of the Gaussian beam and R is the radius of curvature.

Consider the SLM to apply a known hologram pattern $H_0(u,v)$ to the incident beam. The hologram may be selected according to the position of the detector so as to steer the beam to the detector, rather than constraining the detector to be at a specific location or locations. In general $H_0$ will be a complex function describing phase and/or amplitude modulation. In the general case the output field from the SLM is $H_0(u,v) f(u,v) \exp i \phi(u,v)$.

Measure the output from the SLM in the Fourier plane, using a suitably positioned lens or lenses and one or more optical receiving devices to detect the Fourier output at one or more positions. Suitable optical receiving devices would be a photodiode, an optical fibre coupled to a photodiode or a waveguide coupled to a fibre that is itself coupled to a photodiode. Let (x,y) be the co-ordinate system at the Fourier plane. The origin for x and y is the position where the lens optical axis intersects the Fourier plane. Let the Fourier transform of $H_0(u,v) f(u,v) \exp i \phi(u,v)$ be $F_0(x,y) \exp i \theta(x,y)$ where $F_0(x,y)$ describes the amplitude and $\theta(x,y)$ describes the phase. Hence the measured intensity is proportional to the term $F_0^2(x,y)$.

Now change the hologram pattern in a known way at the position $(u_0,v_0)$ where it is required to characterise the beam phase and amplitude such that the hologram pattern H(u,v) becomes that shown in equation (2), as follows:

$$H(u,v)=H_0(u,v)+H_1(u,v) \text{ at } (u,v) \text{ close to } (u_0,v_0)$$

$$H(u,v)=H_0(u,v) \text{ elsewhere.} \quad (2)$$

Hence in a known neighbourhood of the point $(u_0,v_0)$ there is a perturbation in the hologram pattern. Therefore there is also a perturbation in the output field from the SLM, given by $H_1(u,v) f(u,v) \exp i \phi(u,v)$. The incident field amplitude and phase may be approximated to be uniform across the perturbation region, in which case the perturbation in the output field from the SLM may be represented as $H_1(u,v) f(u_0,v_0) \exp i \phi_0(u_0,v_0)$.

As an example consider the perturbation to be a uniform change in phase modulation over the area of a single square pixel of side p, from an initial phase $q_0$ to a new phase $q_1$. This perturbation may be described as a "flashing pixel".

Figure 3:
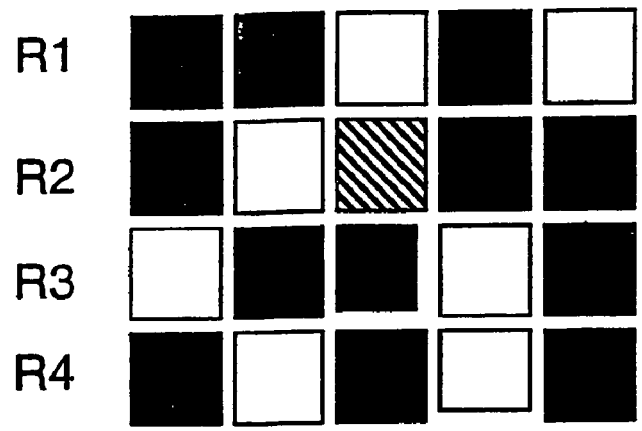
FIG. 3 shows a "flashing pixel"

This is figuratively shown for a binary SLM in FIG. 3. For the sake of clarity the majority of the pixels of the SLM are omitted. Black indicates one sense of phase change and white the opposite sense. The pixel at column 3 row 2 is the flashing pixel which is white for one state of measurement and black for the other.

After the perturbation the phase modulation change applied to the selected pixel may revert to its original value and remain at that value for the rest of the test, for example while other pixels are flashed. For this example $H_1(u,v)$ may be represented by equation (3):

$$H_1(u,v) = \exp iq_1 - \exp iq_0 \quad \forall (u,v): |u-u_0| \leq \frac{p}{2}, |v-v_0| \leq \frac{p}{2} \quad (3)$$

$$= 0 \quad \text{elsewhere}$$

Let the Fourier transform of $H_1(u,v)$ be $g(x,y) \exp i\psi(x,y)$. Hence the Fourier transform of $H_1(u,v) f(u_0,v_0) \exp i\phi(u_0,v_0)$ is given by $f(u_0,v_0) \exp i\phi(u_0,v_0) g(x,y) \exp i\psi(x,y)$. So this perturbation field contains information about the phase and amplitude of the incident beam. For the example given above, the perturbation field is given by equation (4):

$$g(x,y)f(u_0, v_0) = \qquad (4)$$
$$2\sin\left(\frac{q_1 - q_0}{2}\right) p^2 \frac{\sin(\pi px/f\lambda)}{\pi px/f\lambda} \frac{\sin(\pi py/f\lambda)}{\pi py/f\lambda} f(u_0, v_0)$$

$$\exp i\psi(x,y) \exp i\phi(u_0, v_0) =$$
$$\exp i\left(\frac{2\pi}{f\lambda}\{u_0 x + v_0 y\} + \frac{\pi}{2} + q_0 + \frac{q_1 - q_0}{2} + \phi(u_0, v_0)\right)$$

where f is the focal length of the Fourier lens. From the equation the amplitude of the perturbation field in the Fourier plane is proportional to the amplitude of the incident field at the perturbation in the hologram. The phase of the perturbation field includes a constant component equal to the phase of the incident field at the perturbation in the hologram, and also a linear component in x and y proportional to the position of the perturbation in the hologram. This linear component is due to the off-axis position of the perturbation and needs to be taken into account when interpreting phase measurements, as will be described later. The flashing pixel can be considered as equivalent to a source radiating light. When the incident beam is normally incident, the centre of the radiated beam travels parallel to the optical axis towards the Fourier lens, and is then incident at an angle towards the photodetector. The angle of incidence is directly associated with the linear term in equation (4). Note that this linear term disappears at $(x,y)=(0,0)$, at the focal point of the Fourier lens. What happens when the incident beam is incident away from the normal direction is discussed later.

Returning to the general case, in the Fourier plane the field is the Fourier transform of the output field from the SLM. Given that a Fourier transform is a linear operation the field is the sum of the individual Fourier transforms of the original and perturbation field from the SLM. Hence the total field in the Fourier plane, $F(x,y)$ is that given by (5):

$$F(x,y) = F_0(x,y) \exp i\theta(x,y) + f(u_0,v_0) \exp i\phi(u_0,v_0) g(x,y) \exp i\psi(x,y) \qquad (5)$$

Light from the SLM is detected by a detector placed in the output field of the SLM, and typically disposed at a fixed location determined empirically as being within the beam. The analysis given hereafter assumes the detector is a single photodiode that is small enough such that the field amplitude and phase in the Fourier plane may be considered uniform over the active area of the photodiode, or that the phase is varying slowly across it such that the phase of the difference signal term (to be described) may be ascertained. In practice this means that the spatial period of the difference signal should be at least twice the width of the receiving element. Equations are derived for the response and data fitting methods are described to measure the amplitude variation and phase variation of the field incident on the spatial light modulator. As mentioned previously, other receiving elements could be used. Examples are an optical fibre (single mode or multimode) coupled to a photodiode. In the case of a single mode fibre a mode stripper should also be used. Other example receivers are a larger photodiode or an array of photodiodes. For each case, knowing the physics of the receiving process (which involves a coupling efficiency calculation for the optical fibre case) analytical expressions may be used to derive the receiver response, given the incident field as described in equation (5). As is demonstrated for the case of a small single photodiode, data fitting methods may be derived, based on said analytical expressions, to measure the amplitude variation and phase variation of the field incident on the spatial light modulator.

Assuming the field is detected directly by one or more photodiodes, the induced photocurrent at position $(x,y)$ is proportional to the local intensity. The intensity at the Fourier plane contains 3 terms.

The expression for the intensity, $I(x,y)$, is given by equation (6):

$$I(x,y) \propto F_0^2(x,y) + 2F_0(x,y)g(x,y)f(u_0,v_0)\cos \qquad (6)$$
$$\{\phi(u_0, v_0) + \psi(x,y) - \theta(x,y)\} + f^2(u_0, v_0)g^2(x,y)$$

It is assumed that the beam incident on the SLM is spatially coherent, leading to constructive interference at the output field, such that the perturbation in the output intensity distribution is a small effect and second order effects in the perturbation may often be neglected.

The first term $F_0^2(x,y)$ is the original intensity, before the perturbation was applied. This term is conveniently described as a reference signal.

The difference signal is calculated by subtracting the reference signal from the measured signal when the perturbation has been applied. This difference signal contains the second and third terms in equation (6). In practice if the difference signal is weak compared to ambient noise levels, it may be increased by flashing groups of contiguous pixels, at the expense of a reduced resolution in the measurement process.

The second term $2F_0(x,y)g(x,y)f(u_o,v_o)\cos\{\phi(u_0,v_0)+\psi(x,y)-\theta(x,y)\}$ is a coherent coupling term between the original field in the Fourier plane, and the field component created there by the perturbation at the SLM. This second term contains information about the phase and amplitude of the beam incident on the SLM. For the example hologram perturbation the second term also contains information about the flashing pixel.

The third term $f^2(u_0,v_0)g^2(x,y)$ is the intensity that would appear at the Fourier plane if the perturbation was acting on its own, with the original field removed. This third term contains information about the amplitude of the beam incident on the SLM, but not the phase. The values that are to be extracted from the system are $f(u_0, v_0)$ and $\phi(u_0, v_0)$. The other "unknowns" are $g(x,y)$ and $\psi(x,y)-\theta(x,y)$.

For a general case where the incident beam phase varies in an unknown way, usually what is desired is the relative amplitude variation of the beam, but not the absolute amplitude. The terms $F_0(x,y)g(x,y)$ and $g(x,y)$ are independent of the position of the perturbation at the SLM, so can be considered as a multiplying constant. The amplitude $f(u_0, v_0)$ may be measured in several ways.

A first method is to measure the intensity in a region of the Fourier plane where $F_0(x,y)$ is very weak but $g(x,y)$ is relatively stronger such that only the third term is significant. The region of the applied perturbation at the SLM is narrower than the region occupied by the incident beam, hence at the Fourier transform plane the region occupied by the Fourier transform of the perturbation is broader than the region occupied by the Fourier transform of the original field. Hence by varying the position on the SLM where the perturbation is applied a set of measurements of $(g(x,y)f(u_0,v_0))^2$ may be built up at different positions $(u_0,v_0)$. By taking the square root of these measurements values for the relative field amplitude at these positions may be derived.

In general there may be sidelobes or spurious diffraction orders in the beam $F_0(x,y)$ making it difficult to find such a region. Often it may be that $g(x,y)$ is relatively weak and $F_0(x,y)$ is stronger. Therefore it becomes appropriate to use the second term to measure the amplitude. Indeed the $F_0(x,y)$ term acts as a coherent 'amplifier' to boost the strength of this second term. In such a region the third term may be neglected and the second term estimated by subtracting the receiver output before the perturbation was applied from the receiver output in the presence of the perturbation.

A second method is to step through a sequence of distributions $H_0(x,y)$ chosen to have the same values for $F_0(x,y)$ and known changes in the values for $\theta(x,y)$. In an embodiment example $H_0(x,y)$ is a binary phase pattern, in which $F_0(x,y)$ is independent of the relative position of the pattern on the SLM, but $\theta(x,y)$ changes in a known way as the pattern position is changed on the SLM. In general let $\theta(x,y)$ be expressed as given by equation (7):

$$\theta(x,y) = \theta_0 + \theta(m) \tag{7}$$

where m is a variable that represents the known phase associated with the pattern position, and $\theta_0$ represents the sum of the background phase component from the hologram that is not affected by the pattern position and the phase from the incident field.

If this binary phase pattern, $H_0(x,y)$, is periodic then it may be applied to route the reflected beam to the photodiode or other receiving element used to take the measurements. A multiphase periodic pattern could also be used for $H_0(x,y)$. The multiphase method has the advantage of greater diffraction efficiency, but the binary phase method may be implemented on a ferroelectric SLM which tends to be faster.

By applying a set of patterns, at different relative positions on the SLM a set of values may be built up for this second term (from 6). Substituting in equation (7) the term becomes that given in equation (8):

$$2F_0(x,y)g(x,y)f(u_0,v_0)\cos\{\phi(u_0,v_0)+\psi(x,y)-\theta_0(x,y)-\theta(m)\} \tag{8}$$

which may be further expressed as given by equation (9). Note that for a binary phase SLM, the phase change at the pixel where we are measuring the field, $q_1-q_0$ is $+\pi$ or $-\pi$ and therefore the term $\sin(\frac{1}{2}(q_1-q_0))$ in equation (4) has the value $+1$ or $-1$.

$$\alpha(x,y)f(u_0,v_0)\cos\{\beta(x,y,u_0,v_0)\}\cos(\theta(m))+\alpha(x,y)f(u_0,v_0)\sin\{\beta(x,y,u_0,v_0)\}\sin(\theta(m)) \tag{9}$$

$$\text{where } \alpha(x,y)=2F_0(x,y)g(x,y) \tag{10}$$

$$\beta(x,y,u_0,v_0)=\phi(u_0,v_0)+\psi(x,y)-\theta_0(x,y). \tag{11}$$

Equation (9) may be considered as a linear equation in $\cos(\theta(m))$ and $\sin(\theta(m))$, with unknown coefficients $c=\alpha(x,y)\cos\beta(x,y,u_0,v_0)f(u_0,v_0)$ and $d=\alpha(x,y)\sin\beta(x,y,u_0,v_0)f(u_0,v_0)$. Any suitable data fitting method may be used to extract values for these coefficients c and d. A relative value for the amplitude may then be calculated from equation (12) (remembering that $\alpha(x,y)$ acts like a multiplying constant at any Fourier output position $(x,y)$: successive measurements at different $(u_0,v_0)$ will be subject to the same value of multiplying constant).

$$\alpha(x,y)f(u_0,v_0)=\sqrt{c^2+d^2} \tag{12}$$

Other methods could also be used to process the data. The third term from eqn (6) (quadratic in $f(u_0,v_0)$) could also be included in the data fitting.

In an environment with low noise, it may be suitable to use only two pattern positions, and hence two known values of $\theta(m)$, then using the method of simultaneous equations to calculate c and d. The third term from (6) may also be included to improve accuracy, in which case we would need three known values of $\theta(m)$. While the above example assumes an invariant $F_0(x,y)$ and known changes in $\theta(x,y)$ hologram patterns could be selected that maintain an invariant $\theta(x,y)$ and change $F_0(x,y)$ in a known way, or that change both in a known way. Another method is to change the amplitude and/or the phase of the perturbation hologram in a known way.

This latter method of changing the phase in a known way is suitable for a multiphase level SLM. This is a third method to measure the amplitude variation in the incident beam.

Let the SLM apply a uniform phase modulation of $q_0$ except at the flashed pixel where the phase applied is $q_1$. From equations (4) and (6), the coherent coupling term becomes:

$$2K(x,y)f(u_0,v_0)\sin\left(\frac{q_1-q_0}{2}\right)\cos\left(\tau(x,y,u_0,v_0)+\frac{q_1-q_0}{2}\right) \tag{13}$$

where $$K(x,y)=2F_0(x,y)\frac{p^2}{f\lambda}\frac{\sin(\pi px/f\lambda)}{\pi px/f\lambda}\frac{\sin(\pi py/f\lambda)}{\pi py/f\lambda} \tag{14}$$

$$\tau(x,y,u_0,v_0)=\phi(u_0,v_0)+\frac{2\pi}{f\lambda}(u_0x+v_0y)+\frac{\pi}{2}+q_0-\theta(x,y) \tag{15}$$

Simplifying, we obtain a coherent coupling term given by:

$$K(x,y)f(u_0,v_0)\{\cos(\tau(x,y,u_0,v_0))\sin(q_1-q_0)-\sin(\tau(x,y,u_0,v_0))(1-\cos(q_1-q_0))\} \tag{16}$$

Clearly this term disappears as the perturbation in the local phase, $q_1-q_0$, tends to zero (or pi).

In a low noise environment we may measure the output with two sequential different known phase perturbations, compare with the output in the absence of the phase perturbation and then use simultaneous equations to calculate the values of $K(x,y)f(u_0,v_0)\cos(\tau)$ and $K(x,y)f(u_0,v_0)\sin(\tau)$. Squaring and adding and then taking the square root we obtain $K(x,y)|f(u_0,v_0)|$.

If we set the two phase perturbations to +pi/2 and −pi/2 the coherent coupling term becomes:

$$C(+)=K(x,y)f(u_0,v_0)\{\cos(\tau)-\sin(\tau)\} \tag{17}$$

$$C(-)=K(x,y)f(u_0,v_0)\{-\cos(\tau)-\sin(\tau)\} \tag{18}$$

Taking the sum of the square of $C(+)$ and the square of $C(-)$ and then taking the square root we also obtain $K(x,y)|f(u_0,v_0)|$.

The term $K(x,y)$ depends on the photodiode position and not the flashing pixel position. Hence a set of measurements of $K(x,y)f(u,v)$ at different pixel positions describes the relative variation in the incident amplitude at the SLM.

Further we may obtain $K(x,y)f(u_0,v_0)\sin(\tau)$ from $C(+)+C(-)$ and $K(x,y)f(u_0,v_0)\cos(\tau)$ from $C(+)-C(-)$ and then divide to obtain $\tan(\tau)$. How to use the value of $\tau$ to measure the incident phase $\phi(u_0,v_0)$ will be discussed later.

This method of changing the phase at one pixel, while maintaining a constant phase elsewhere, may also be used to characterise the phase modulation of the SLM. Typically the phase vs. volts response of a liquid crystal SLM may be characterised by measuring output intensity changes when the device is intermediate between crossed or parallel polarisers oriented at 45 degrees to the plane of tilt of the liquid crystal director, and the applied voltage is varied. However, such intensity changes disappear when the SLM contains a QWP designed and fabricated for the wavelength at which the phase response is required. An alternative is to use Young's double slit to characterise the phase, observing the fringes created in the Fourier plane with a detector array and measuring how the fringe peaks shift as the voltage applied to the phase modulating pixels behind one of the slits is varied. Aligning the slits with a small pixel array can be time consuming and increase the characterisation time. Often there are awkward design tradeoffs between the slit separation and the width of the slits. The difference signal described in equation (13) may also be used to measure the phase. The reference signal is $F_0^2(x,y)$. Hence dividing the difference signal by the square root of the reference signal we obtain the normalised difference signal given in equation (19), where c is a constant of proportionality.

$$cf(u_0, v_0) \frac{p^2}{f\lambda} \frac{\sin(\pi px/f\lambda)}{\pi px/f\lambda} \frac{\sin(\pi py/f\lambda)}{\pi py/f\lambda} \sin\left(\frac{q_1 - q_0}{2}\right) \cos\left(\tau + \frac{q_1 - q_0}{2}\right) \quad (19)$$

The output is measured with a 1-D or 2-D photodiode array. Keep all the pixels apart from the one or group to be flashed at a reference voltage: in the analysis these have an associated phase modulation $q_0$. Select one or a group of pixels and apply a different voltage: in the analysis these have an associated phase modulation $q_1$. The aim of the method described is to measure how the relative phase $q_1-q_0$ varies as a function of the voltage applied to the flashing pixel. Vary the selected pixel or group of pixels in order to maximise the strength of the normalised difference signal. This selected pixel or group of pixels will correspond to the peak of the incident beam, which is where $f(u_0,v_0)$ is maximised. The phase term $\tau$ naturally varies across the array because of the linear phase term in (15), unless the flashing pixel happens to coincide with the optical axis of the lens. Hence the measured output is a set of sinusoidal fringes inside a slowly varying sinc envelope, with an amplitude proportional to $\sin((q_1-q_0)/2)$. The fringe period may be conveniently optimised by adjusting the position of the beam incident on the SLM with respect to the optical axis of the Fourier lens. For example at a wavelength of 1.5 um, with a Fourier lens of focal length 15 cm and $u_0$=1 mm, the period at the photodiode array would be 232 um, covering 9 pixels of a 25 um pitch photodiode array. Note that the width of the sinc envelope is created by the width of the flashing pixel or group of pixels. As the width of this group is narrower than the beam the envelope created will be broader than the signal $F_0(x,y)$. Hence dividing by the square root of the reference signal increases the number of measurable fringes. For example with the same wavelength and Fourier lens focal length, and a pixel group of width 200 um, the width of the sinc main lobe would be 2325 um, containing 93 pixels, or 10 complete fringes.

Adjust the voltage applied to the flashing pixel or group of flashing pixels until the fringe amplitude is maximised. This identifies the voltage creating a relative phase of $\pi$. In practice there may be a finite set of available voltages. Therefore data fitting may be used to identify the actual voltage and fringe amplitude corresponding to a relative phase of $\pi$. Let this fringe amplitude be A. Therefore by dividing the normalised reference signal by A for a range of voltages applied to the flashing pixel, we obtain the value of $\sin((q_1-q_0)/2)$, from which we may calculate $q_1-q_0$ for the flashing pixel.

It is important in such measurements to use a stable input beam. If there are slowly varying (temporal) changes in the input beam, it is necessary to take fresh measurements of the reference signal in between each measurement of the difference signal.

Returning to methods for measuring the incident amplitude, the general principle is to be able to take a sequence of measurements with some known parameters changing in a known way and use data fitting to extract the values of the unknown parameters. These unknown parameters may be combined in a way that extracts the incident field amplitude without requiring knowledge of the incident field phase.

Another measurement that may be required is to check that the pixels are functioning correctly. Take a measurement of the output intensity with the original hologram applied: this could be the coupling efficiency into a fibre, or the output from a photodiode, or the outputs from a photodiode array. Now flash a pixel, one at a time, preferably with a phase perturbation $q_1-q_0$ close to $\pi$ so as to maximise the effect. Calculate the relative amplitude as described above. If there is no significant amplitude then either the pixel is outside the area of the incident beam or the pixel drive circuit is not functioning. If the amplitude varies in a smooth manner like the expected profile then the pixels are working correctly. If there is a discontinuous jump in the response to a higher value then the pixel may be shorted to another pixel. If there is a discontinuous jump to a lower value then the pixel is not being driven correctly.

In some systems what is required is to check or measure the position of the field with respect to the SLM pixels. The peak measured amplitude will occur when the pixel being flashed coincides with the peak of the incident beam.

In many cases it may also be required to measure the phase variation in the incident field. The methods described hereafter explain how to measure the variation in the u direction in the interests of clarity. However the method is easily extended to measurements in both u and v directions.

In the first case we consider the example of a binary phase SLM where successive measurements are obtained at a single flashed pixel by shifting the position of the pattern $H_0(x,y)$ on the SLM.

Given the data fitted values of the coefficients c and d the phase term $\beta(x,y,u_0,v_0)$ may be calculated using equation (20).

$$\cos(\beta(x, y, u_0, v_0)) = \frac{c}{\alpha(x, y)f(u_0, v_0)} \quad (20)$$

$$\sin(\beta(x, y, u_0, v_0)) = \frac{d}{\alpha(x, y)f(u_0, v_0)}$$

In the second case we consider the example of a multiphase SLM where the original or reference pattern is uniform phase modulation. The values of $K(x,y)f(u_0,v_0)\cos(\tau)$ and $K(x,y)f(u_0,v_0)\sin(\tau)$ may be calculated as described earlier and solved jointly to obtain $\tau(x,y,u_0,v_0)$.

In what follows we discuss how to interpret the value of $\beta$, but the discussion and methods apply equally to the value of $\tau$.

let the initial position $(u_0, v_0)$ be a reference point such that the phase at any arbitrary point (u,v) is measured with respect to the phase at $(u_0, v_0)$. Using (4) there is obtained a general expression for $\beta(x,y,u_0,v_0)$ as shown in equation (21):

$$\beta(x, y, u_0, v_0) = \tag{21}$$

$$\frac{2\pi u_0 x}{f\lambda} + \phi(u_0, v_0) + \left\{\frac{2\pi v_0 y}{f\lambda} + \frac{\pi}{2} + \frac{q_0 + q_1}{2} - \theta_0(x, y)\right\}$$

Now consider the effect of changing the position of the hologram perturbation to $(u, v_0)$ but maintaining the position of the output receiver at $(x,y)$. The value of $\beta$ becomes that shown in equation (22):

$$\beta(x, y, u, v_0) = \frac{2\pi u x}{f\lambda} + \phi(u, v_0) + \left\{\frac{2\pi v_0 y}{f\lambda} + \frac{\pi}{2} + \frac{q_0 + q_1}{2} - \theta_0(x, y)\right\} \tag{22}$$

The difference in the values of $\beta$ contains two terms, the first (in curly brackets) is the required phase difference being measured, while the second is a linear phase term, as shown in equation (23):

$$\beta(x, y, u, v_0) - \beta(x, y, u_0, v_0) = \{\phi(u, v_0) - \phi(u_0, v_0)\} + \frac{2\pi(u - u_0)x}{f\lambda} \tag{23}$$

Therefore to extract the required phase difference a method is needed to estimate or measure the linear phase term. Given knowledge of the pixel pitch on the SLM it is straightforward to calculate $(u-u_0)$. Similarly knowledge of the wavelength, $\lambda$, is established. The focal length can be measured. Therefore it is possible to know to a high degree of accuracy the value of $2\pi(u-u_0)/f\lambda$. What may be difficult is to obtain an accurate value of x, the distance in the x direction from the point where the lens optical axis intersects the Fourier plane to the receiving element. In some situations it may be possible to place the receiving element at the focal point in which case the linear term is zero.

One method to overcome this difficulty is to pre-calibrate the system with a reference beam. This could be a well-collimated beam, or a beam of known phase variation (using for example a pinhole to generate the reference beam), or a beam such that the phase of any arbitrary beam needs to be measured with respect to the reference beam. Let the subscript R represent the corresponding measurements for the reference beam. Hence equation (24) is obtained:

$$\beta_R(x, y, u, v_0) - \beta_R(x, y, u_0, v_0) = \tag{24}$$

$$\{\phi_R(u, v_0) - \phi_R(u_0, v_0)\} + \frac{2\pi(u - u_0)x}{f\lambda}$$

Therefore if the $\beta$ difference is measured for the reference beam and the phase variation across the reference beam is known, the value of the linear phase term may be calculated. Furthermore, by repeating this process for several different positions u on the SLM a data fitting method may be used to calculate the value of the unknown parameter x.

Without knowledge of the phase variation of the reference beam but with a need to use it as a baseline, it is necessary to measure the $\beta$ difference for the beam under test, and subtract from it the $\beta$ difference for the reference beam, at the same positions u and $u_0$. Alternatively interpolation may be used to predict the $\beta$ difference for the reference beam if it has not been measured at precisely the required points. An expression may be obtained for the phase variation with respect to the baseline variation, as shown in equation (25):

$$\beta(x, y, u, v_0) - \beta(x, y, u_0, v_0) - \{\beta_R(x, y, u, v_0) - \beta_R(x, y, u_0, v_0)\} = \tag{25}$$

$$\phi(u, v_0) - \phi(u_0, v_0) - \{\phi_R(u, v_0) - \phi_R(u_0, v_0)\}$$

Another suitable reference beam is a Gaussian beam from a IR HeNe laser or another beam with a well-defined main peak at the Fourier plane. One method is to arrange that the beam is normally incident on the SLM, and that the SLM is perpendicular to the optical axis of the Fourier lens. Let uniform phase modulation be applied by the SLM such that it acts like a plane mirror. In this case the peak of the reflected beam will reach the Fourier plane at the focal point, thus determining the position where x=0. What is required is to measure the x position of the photodetector or other receiving element. Beam-steering holograms of known beam deflection d in the x direction may be applied by the SLM and the incident power measured at the receiving element. The value of d at which this power is maximised is equal to the x displacement of the receiving element from the optical axis, therefore determining the unknown parameter x.

The peak of the characterised beam, $(u_{PK}, v_{PK})$ may be identified by data fitting or centroid methods on the amplitude distribution, where this distribution may be measured as described earlier. Adapting the expression for the $\beta$ difference (eqn 23) the relative phase variation measured with respect to this peak becomes that shown in equation (26) where it is assumed as described earlier, that $u-u_{PK}$, f and $\lambda$ are known and x has been measured by one or more of the methods described:

$$\beta(x, y, u, v_0) - \beta(x, y, u_{PK}, v_0) = \tag{26}$$

$$\{\phi(u, v_0) - \phi(u_{PK}, v_0)\} + \frac{2\pi(u - u_{PK})x}{f\lambda}$$

In subsequent wavefront sensing tests, the linear phase term in (23) (and (26)) may be calculated using the measured value of x and subtracted from the $\beta$ difference to obtain the relative phase variation across the beam under characterisation, $\phi(u,v)-\phi(u_{PK},v)$. Generalising to the 2D case we may also determine the y position of the receiving element, and calculate the relative phase variation with respect to the centre of the beam, $\phi(u,v)-\phi(u_{PK},v_{PK})$. The partial derivatives with respect to u and v of the phase at $u=u_{PK}$ and $v=v_{PK}$ may be calculated from the relative phase variation and used to determine the absolute angle of incidence of the beam upon the SLM.

In a more general case a beam may be incident at an angle, $\gamma$, with respect to the optical axis. This angle of incidence creates a linear phase slope, $2\pi \sin(\gamma)/\lambda$ at the flashing pixel. From Fourier theory (and also from geometric optics) this phase slope creates an offset at the Fourier plane. Hence the field generated by the flashing pixel is displaced along the x-axis by $x_0 = f \tan(\gamma)$. The angle of incidence also creates a linear phase slope across the original hologram pattern, $H_0(u, v)$. For a normally incident beam let the FT of the field reflected from the original hologram, that is the reference field, be $F_0(x,y).\exp i\theta(x,y)$. The effect at the Fourier plane of changing the angle of incidence to $\gamma$ is to change the reference field to $F_0(x-x_0,y).\exp i\theta(x-x_0,y)$, representing a displacement of $x_0$ along the x axis. The difference signal is created by the coherent overlap of the flashing pixel field and the reference field. Therefore the difference signal is also displaced along the x axis by an amount $x_0$. Hence the $\beta$ difference term in equation (26) becomes that given in equation (27):

$$\beta(x, y, u, v_0) - \beta(x, y, u_{PK}, v_0) = \qquad (27)$$
$$\{\phi(u, v_0) - \phi(u_{PK}, v_0)\} + \frac{2\pi(u - u_{PK})(x - x_0)}{f\lambda}$$

In this expression, the term in the curly brackets represents the relative phase variation of the incident beam, for the case of normal incidence, while the linear term is created by the angle of incidence. Hence the curly bracket term represents the beam defocus, decoupled from angle of incidence effects.

In the absence of the flashing pixel perturbation, known beam-steering patterns may be applied by the SLM to measure the x displacement of the receiving element from $x_0$, in order to calculate $x-x_0$. A linear phase term $2\pi(u-u_{PK})(x-x_0)/f\lambda$ may be calculated and subtracted from the $\beta$ difference in equation (27) to obtain the curly bracket term, and hence the beam defocus.

Given the value of x, as measured using one of the methods described earlier, the angle of incidence may be extracted from the phase result. This may be achieved by subtracting $2\pi(u-u_{PK})x/f\lambda$ from the $\beta$ difference given in (27) and calculating the partial derivatives of the result with respect to u and v at the beam centre.

It is useful to extend this analysis to consider the effect of beam deflection by a beam-steering hologram. In this example the original hologram pattern, $H_0(u,v)$ is a routing hologram that creates a set of discrete diffraction orders positioned along the x-axis as described in equation (28):

$$x_n = x_0 + \frac{nf\lambda}{\Lambda} \qquad (28)$$

where $\Lambda$ is the beam steering period and $x_0$ may be non-zero, due to a non-zero angle of incidence at the SLM. Let $F_0(x,y)$ exp i $\theta_0(x,y)$ represent the field at the Fourier plane when the SLM is applying a uniform phase modulation. Also let the phase and amplitude of the diffraction order used to route to the receiving element be $\theta_R$ and $c_R$, respectively. Hence the routing hologram creates a diffraction order described by $c_R F_0(x-x_n,y)$exp i $\{\theta_0(x-x_n,y)+\theta_R\}$. In the first method of using a routing hologram, variations in the difference field were created by shifting the routing hologram across the SLM in order to change the phase of the diffraction order, and thus change the phase difference with respect to the flashing pixel field. In this second method let the variations in the difference field be created by changing the phase difference applied by the flashing pixel. Hence the relevant phase term to consider is $\tau$, although the analysis can equally be applied to $\beta$. The relevant expression for $\tau$ is given in equation (29):

$$\tau(x, y, u, v) = \qquad (29)$$
$$\frac{2\pi}{f\lambda}\{u(x - x_0) + vy\} + \frac{\pi}{2} + q_0(u, v) + \phi(u, v) - \theta_0(x - x_n, y) - \theta_R$$

Note that the original hologram phase, $q_0$, now depends on the pixel position, since the original hologram pattern is a routing hologram, rather than a uniform phase distribution.

The relative variation in $\tau$ with respect to the beam centre at $(u_{PK}, v_{PK})$ becomes that given in (30):

$$\tau(x, y, u, v) - \tau(x, y, u_{PK}, v_{PK}) = \qquad (30)$$
$$\frac{2\pi}{f\lambda}\{(u - u_{PK})(x - x_0) + (v - v_{PK})y\} +$$
$$\phi(u, v) - \phi(u_{PK}, v_{PK}) + q_0(u, v) - q_0(u_{PK}, v_{PK})$$

The phase component $q_o(u,v) - q_0(u_{PK}, v_{PK})$ is a known quantity and hence may be subtracted to obtain the expression given in equation (31):

$$\tau(x, y, u, v) - \tau(x, y, u_{PK}, v_{PK}) - \{q_0(u, v) - q_0(u_{PK}, v_{PK})\} = \qquad (31)$$
$$\frac{2\pi}{f\lambda}\{(u - u_{PK})(x - x_0) + (v - v_{PK})y\} + \phi(u, v) - \phi(u_{PK}, v_{PK})$$

The result on the right hand side of this equation is a 2D extension of that in (27), but is otherwise isomorphic. Hence the beam deflection created by the hologram does not corrupt the phase measurement.

The data processing methods analysed so far have assumed detection with a single photodiode or an array of photodiodes. It is also possible to measure the amplitude and phase at the SLM by detecting the output power from a single-mode fibre or waveguide. One advantage of such a method is that there is no need for a beamsplitter, which necessarily introduces an insertion loss. Hence the waveguide method may be used for an assembled system: the actual waveguide used could be one of the normal device ports, or a separate port used specifically for sensing. A second advantage is that it could be used for remote sensing, using fibres routed to a set of different sensors, with a common head-end for detecting and processing the signals returned from the sensor.

The power, P, coupled into the fundamental mode of a single-mode waveguide may be measured with a photodiode, and is given by equation (32), in which $\eta_2(x,y)$ is the field distribution (assumed real) of the fundamental mode, and $\eta_1(x,y)$ is the complex field incident on said waveguide:

$$P = \frac{\left|\int_{-\infty}^{\infty}\int_{-\infty}^{\infty}\eta_1^*(x, y)\eta_2(x, y)dxdy\right|^2}{\int_{-\infty}^{\infty}\int_{-\infty}^{\infty}|\eta_2(x, y)|^2dxdy} \qquad (32)$$

Assume that the field routed towards said waveguide by the original hologram is well aligned with that waveguide and has a beam profile suitable for good coupling efficiency into the waveguide. Hence we may approximate:

$$F_0(x, y) \approx A\exp-\left\{\frac{(x - x_F)^2 + y^2}{\omega^2}\right\} \qquad (33)$$

$$\theta_0(x, y) \approx \theta_0 \qquad (34)$$

where $\omega$ is the spot size of the fundamental mode, and $(x_F, 0)$ are the co-ordinates of the centre of the mode. The method may also be applied for other cases of beam shape and alignment, although the analysis is more complex.

When the original hologram pattern is applied the coupled power is given by $P_0 = A\pi\omega^2/2$ which forms the reference signal.

The flashing pixel field with a non-zero angle of incidence may be substituted into (32) to calculate the difference signal in the coupled power that is created by the flashing pixel. Using the approximation that the sinc terms in the overlap integral of (32) are slowly varying and may be taken outside the integral, the result for a flashing pixel applied at position (u,v) is given by the expression in equation (35):

$$K'(x, y) \exp-\left\{\frac{u^2 + v^2}{\omega_{SLM}^2}\right\} f(u, v) \sin\left(\frac{q_1 - q_0}{2}\right) \cos\left(\chi(u, v) + \frac{q_1 - q_0}{2}\right) \quad (35)$$

where K'(x,y) varies slowly with (x,y), $\omega_{SLM}$ is the beam spot size at the SLM, and $\chi(u,v)$ is given in equation (36):

$$\chi(u, v) = \frac{2\pi u(x_F - x_0)}{f\lambda} + \phi(u, v) + q_0(u, v) - \theta_0 \quad (36)$$

and $x_0$ is the output position, at the Fourier plane, of the specularly reflected beam when the SLM is acting as a uniform phase object normal to the optical axis. By varying $(q_1-q_o/2)$ as described earlier, values may be extracted for $\chi(u,v)$ and also for the amplitude term given in equation (37):

$$K'(x, y) \exp-\left\{\frac{u^2 + v^2}{\omega_{SLM}^2}\right\} f(u, v) \quad (37)$$

The value of $x_F-x_0$ is related to the beam steering period at the hologram, $\Lambda$, as shown in equation (28). Assuming the first diffraction order is used to route to the waveguide, the expression for $\chi(u,v)$ may be written as in equation (38):

$$\chi(u, v) = \frac{2\pi u}{\Lambda} + \phi(u, v) + q_0(u, v) - \theta_0 \quad (38)$$

Hence the relative variation in $\chi(u,v)$ may be calculated, as shown in equation (39):

$$\chi(u, v) - \chi(u_0, v) = \quad (39)$$
$$\{\phi(u, v) - \phi(u_0, v)\} + q_0(u, v) - q_0(u_0, v) + \frac{2\pi(u - u_0)}{\Lambda}$$

The difference in $q_0$ and the linear term are known quantities and therefore may be subtracted to calculate the relative phase variation across the beam incident on the SLM.

The expression for the amplitude in (37) is interesting. The middle term in this expression is a result of the dependence of the waveguide coupling efficiency on the angle of incidence of the incident beam, and is absent or much weaker for a photodiode. To extract the required amplitude variation, f(u, v), requires an additional calibration step, which is to determine the absolute values of u and v for the SLM pixels.

Figure 7:
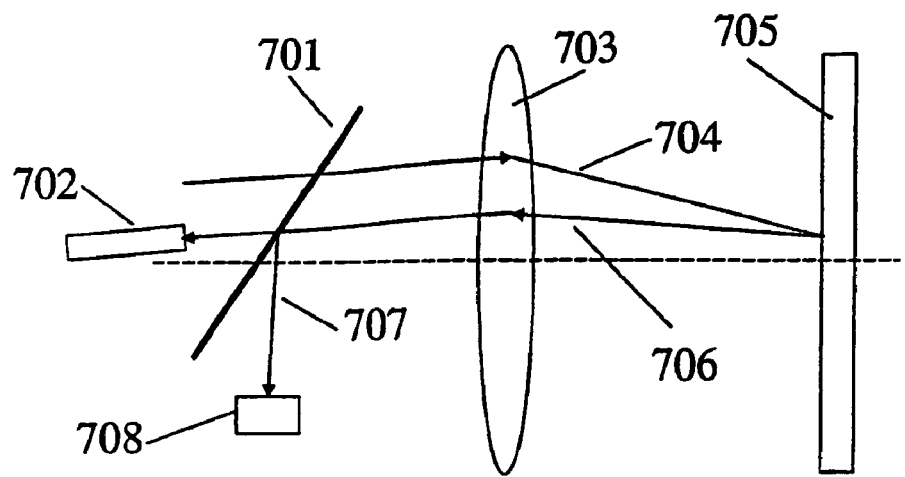
FIG. 7 shows an embodiment of a device used for calibrating an SLM.

A method to achieve this is illustrated in FIG. 7, in which a beamsplitter 701 is inserted between the waveguide 702 and Fourier lens 703. In this example the input beam 704 is incident on the SLM 705 via the Fourier lens 703 and is shown at a non-zero angle of incidence. A suitable input beam would be that coming from the sensing waveguide 702 or another waveguide, preferably parallel to the sensing waveguide. The reflected beam 706 is steered by the beam-steering hologram displayed on the SLM to the waveguide 702. A fraction of the beam energy 707 is split off by the beamsplitter 701 towards the photodiode 708. Wavefront sensing at the photodiode may be used to measure K(x,y)f(u,v) as a function of u and v. Data fitting to the result may be used to extract the pixel addresses of the centre of the beam as it reaches the SLM, and also the spot size at the SLM, $\omega_{SLM}$. Wavefront sensing at the waveguide may be used to measure the amplitude term given in (37). The ratio of the amplitude measurements at the photodiode and waveguide yields the value of $\exp-\{(u^2+v^2)/\omega_{SLM}^2\}$. Data fitting to the result may be used to extract the pixel address of the position (u,v)=(0,0), that is where the optical axis of the lens intersects the SLM. Hence, as required for subsequent sensing tests, the absolute values of u and v may be calculated.

Further, this calibration process indicates whether the centre of the beam at the SLM coincides with the optical axis, providing useful information that may be fed back to alignment equipment that adjusts the tilt of the waveguide or waveguides until the centre of the beam does coincide with the optical axis, at which point the input beam is parallel to that axis.

Having described how the wavefront sensing may be implemented we now discuss how it may be applied to solve alignment problems.

Figure 5:
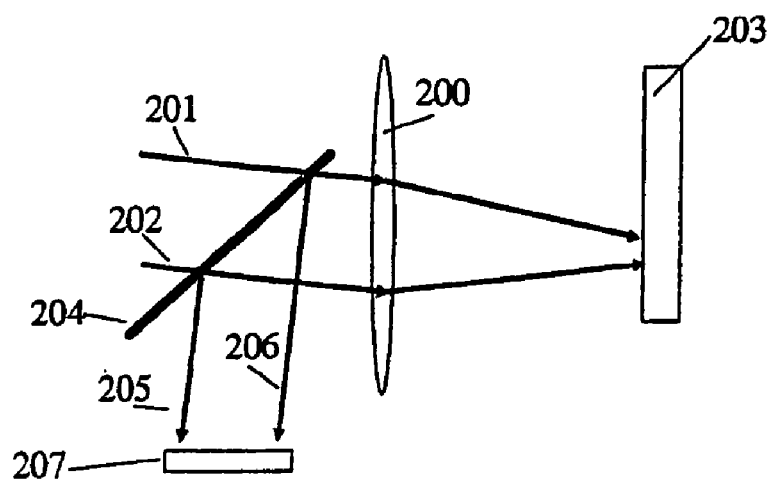
Figure 6:
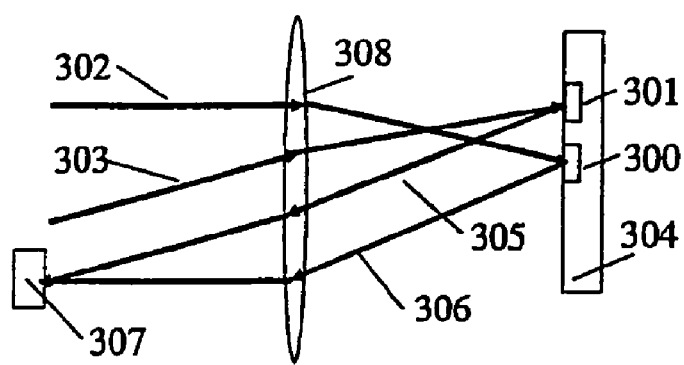

In the first example an SLM or its pixel assignment is required to be aligned with a set of one or more beams. Some embodiments are shown in FIGS. 4, 5 and 6.

Figure 4:
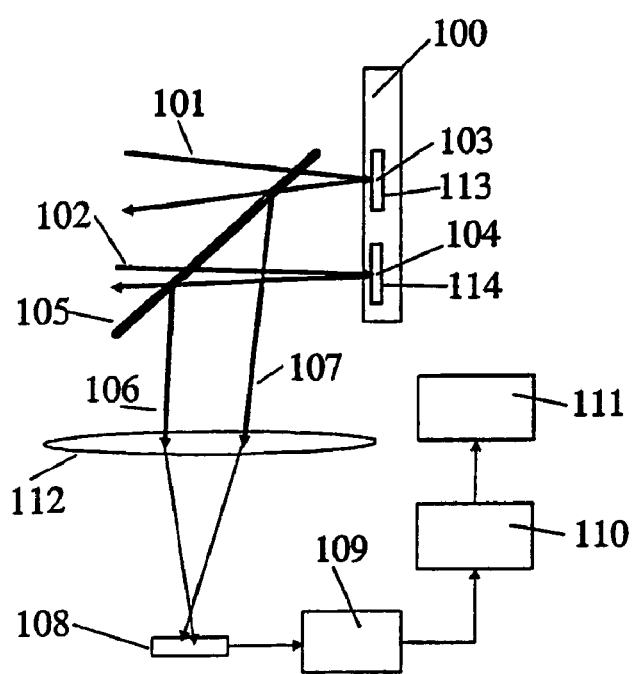
FIGS. 4, 5 and 6 show embodiments of apparatus for aligning an SLM or its pixel assignment with a set of one or more beams.

FIG. 4 shows an SLM 100 with two incident beams 101 and 102. Beam 101 is incident with its centre or another known feature of the beam at position 103 on the SLM and beam 102 is incident with its centre or another known feature of the beam at position 104 on the SLM. A beamsplitter 105 is used to deflect a fraction of the reflected beams 106 and 107 through a Fourier lens 112 to a photodiode, to photodiodes or other receiving element 108 connected to signal processing means 109. In one embodiment the beamsplitter, 105, is a cube beamsplitter of the type that does not cause a transverse displacement of the beam. However, if the subsequent optical processing (after wavefront sensing) requires the beamsplitter to remain in position, it does not matter if it introduces such a displacement.

If the two beams 101 and 102 are from different sources, or with a significant relative delay so as to make them incoherent with respect to each other, the field generated by the flashing pixels in the area of the SLM for which the incident amplitude of beam 101 is significant will be coherent with the reflected beam 106, but incoherent with the reflected beam 107. As a result, a difference signal will be created by the overlap of the flashing pixel field and the reflected beam 106, but not by the overlap of the flashing pixel field and the reflected beam 107. Hence the measured difference signal from this flashing pixel will not be corrupted by the presence of the second beam, thereby allowing accurate wavefront sensing of the first beam. However, if the two beams to be sensed are from the same source or coherent then it may be necessary to switch one off at a time to avoid the generation of additional unwanted difference signals.

In a first alignment application what is required is to adjust the transverse position of the SLM with respect to this set of one or more beams. Wavefront sensing may be applied to measure the amplitude distribution of the two beams as a function of the pixel address of the flashed pixels.

A first class of this application is suitable for Gaussian incident beams, or other beams with an even symmetric amplitude distribution. For this class of beams, data fitting or centroiding methods may be applied to calculate the pixel address of the centres 103 and 104 of said beams. The results may be fed back from the signal processor 109 to a control system 110 that compares these pixel addresses with the desired addresses for the centres of said beams, calculates how much the SLM needs to be moved so that the centres of the beams are at the desired addresses, and adjusts the position of the SLM by that amount using an electronically controlled positioning system 111. Alternatively, or as well, the SLM position may be adjusted and the beam centre positions compared with the desired positions until the beam centre positions reach the desired positions.

A second class of this application is suitable for other incident beams, without even symmetry, but with known features in the beam (such as an edge created by an aperture). These features may be identified in the measured amplitude distribution and data fitting or feature extraction used to calculate the location of these features as a pixel address. Again the results may be fed back from the signal processor 109 to a control system 110 that compares these pixel addresses with the desired addresses for these features, calculates how much the SLM needs to be moved so that the features arrive at the desired pixel addresses, and adjusts the position of the SLM by that amount using an electronically or manually controlled positioning system 111. Alternatively, or as well, the position may be adjusted and the feature positions 103 and 104 compared with the desired positions until the feature positions reach the desired positions.

In a second alignment application what is required is to assign or re-assign a block of pixels to the incident beams. Pixel blocks 113 and 114 may be assigned originally to each beam. Each block of pixels is to be used to perform optical processing on a particular beam. For the first class of beams, the calculated pixel addresses of the centres of each beam may be used to assign or re-assign the pixel addresses of the block of pixels that is intended to perform optical processing on that beam. For the second class of beams, the calculated pixel addresses of the known features in the beam may be used to assign or re-assign the pixel addresses of the block of pixels that is intended to perform optical processing on the beam.

In a third alignment application what is required is to adjust the longitudinal position of the SLM with respect to the beams.

In a first method the phase distribution (defocus) in one or more incident beams may be measured using the wavefront sensing methods described, and the longitudinal position adjusted using a positioning system until said phase distribution reaches a target or optimised value.

In a second method the measured phase distribution (defocus) may be used to calculate how much the SLM should be moved longitudinally, and the position of the SLM 100 adjusted using a manually or electronically controlled positioning system until the target or an optimised phase distribution is reached.

In a third method the transverse position at which two beams arrive on the SLM may be extracted from a measurement of the amplitude distribution, based on the beam centre or some known feature of the beam, as described earlier. The longitudinal position of the SLM may be adjusted and the incident beams re-measured until their relative position reaches a target or optimised value.

In a fourth method the change in beam transverse position with longitudinal position of the SLM may be measured and used to calculate how much the SLM should be moved longitudinally, and the position of the SLM 100 adjusted using a manually or electronically controlled positioning system until the target or an optimised relative position is reached.

In a fourth alignment application what is required is to adjust the tilt of an incoming beam. The angle of incidence on the SLM may be measured as described earlier and the beam tilt adjusted until the required value is reached. Alternatively or as well, the error in the angle of incidence may be used to calculate the tilt adjustment required to achieve the target value.

FIGS. 5 and 6 show alternative embodiments for taking the aforementioned or other wavefront sensing measurements.

In FIG. 5 there is already a lens 200 in the path of the incident beams 201 and 202 before said beams reach the SLM 203. The lens may be at the Fourier plane of the SLM but does not have to be, as explained earlier. The beamsplitter may be positioned between the lens 200 and the SLM 203, as in the previous example. Alternatively the beamsplitter 204 may be placed as in FIG. 5, such that the beams 205 and 206 reflected from the SLM 203 are deflected towards the receiving element 207 after passing through the lens 200. This method has the advantage that the relative alignment of the lens 200 and SLM 203 is not affected by displacements and optical path differences introduced by the beamsplitter 204.

In a third arrangement (FIG. 6) the pixel blocks 300 and 301 assigned to the incident beams 302 and 303 on the SLM 304 are applying routing holograms, as described earlier, such that the reflected beams 305 and 306 may be deflected towards the receiving element 307 without the need for a beamsplitter. This receiving element 307 may be in the same plane or a different plane to the incident beam 308. The position of the Fourier lens 308 shown in the Figure is such that both incident and reflected beams pass through the lens. However it could be positioned so that only the beam steered towards the receiving element 307 passes through the lens.

Having described how alignment problems may be solved by using wavefront sensing we now describe how to use wavefront sensing to monitor beams entering an optical system that uses an SLM to perform optical processing, and also how to control the assignment of pixel blocks to the beams that are being processed.

Figure 8:
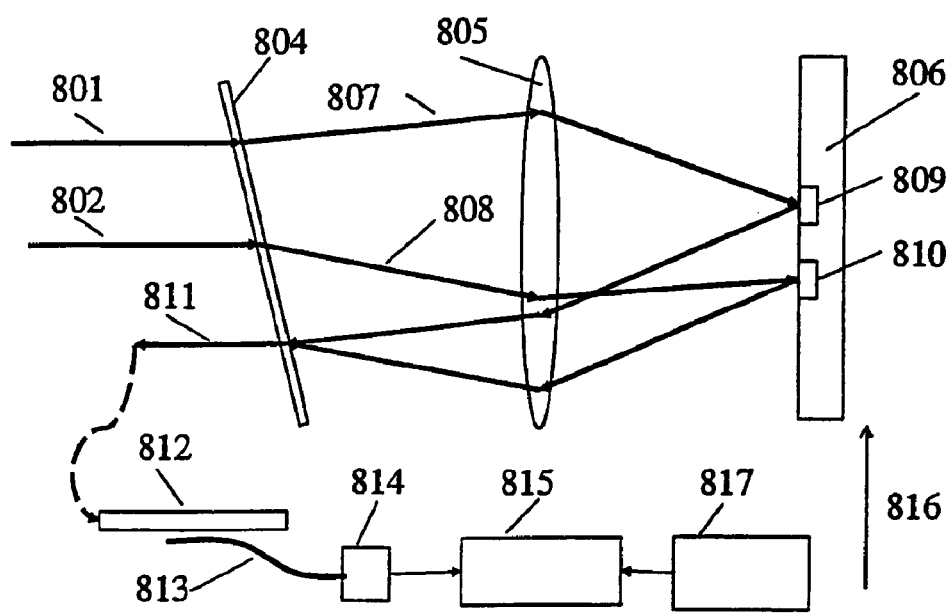
FIG. 8 shows a first device using wavefront sensing to monitor a beam.

In a first application (FIG. 8) it is assumed that there are one or more beams 801, 802 entering the optical system from an optical fibre 803, each containing an ensemble of one or more signals at different wavelengths. A diffraction grating or prism 804 close to the focal plane of a routing lens 805 is used to disperse the channels onto an SLM 806 at the other focal plane of the lens. Two channels 807, 808 are shown on the figure. Each wavelength signal has associated with it an individual pixel block 809, 810 to which various holograms are applied to route, equalise and block the beam. Hence there is a contiguous row of such pixel blocks 811 across the SLM 806.

The different wavelength signals entering the system are incoherent with respect to each other. Therefore the field generated by a flashing pixel in an SLM pixel block 809 receiving a first wavelength channel 807 will be incoherent with the field reflected from an SLM pixel block 810 receiving a second wavelength channel 808. Hence the overlap between the flashing pixel field and the field at the second wavelength will not generate a difference signal at the receiving element 812. Therefore the presence of this second wavelength will not corrupt wavefront sensing of the first wavelength. Similarly, the beam at the second wavelength may be sensed by flashing pixels in its own pixel block, without interference from the first wavelength.

In a first method the flashing pixels are used to sense the beams that are subsequently routed out of the optical system. In this example the receiving element 812 will be the output optical fibre to which the channels are routed. A monitor tap coupler in this optical fibre 813 may be used to extract a fraction of the output signal and route this to a photodiode 814 connected to signal processing circuitry 815 which extracts the superposition of the difference signals for all the wavelength signals entering that output fibre.

Figure 9:
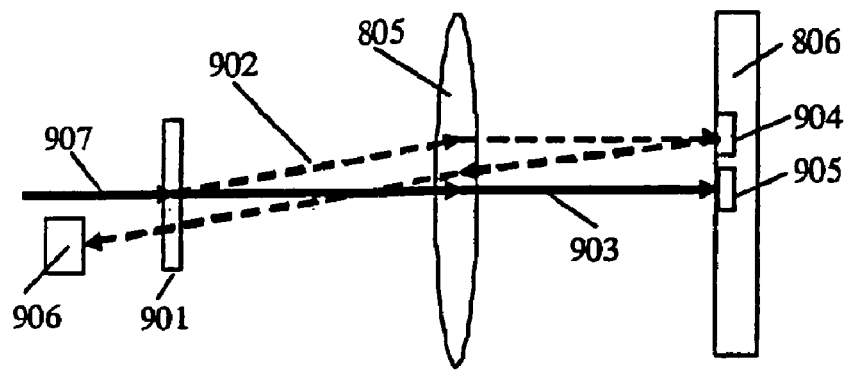
FIG. 9 shows a second device using wavefront sensing to monitor a beam.

In a second method (FIG. 9) the flashing pixels are used to sense a copy of the beams that are subsequently routed out of the optical system. Compared to the first method, this has the advantage that difference signals are not added to the data carried by the wavelength channels.

A free space optical tap 901 is used to create a weak copy 902 of the input beams at an angle to the remaining energy in the input beams 903, hereinafter referred to as the main input beams. The weak copy beams 902 propagate to a separate row of pixel blocks 903, while the main input beams propagate to the row of pixel blocks 904 used for routing, channel blocking and channel equalisation. The copy of the input beams 902 may be routed or specularly reflected, as desired, to a receiving element 905, where overlap with fields generated by flashing pixels will create a superposition of difference signals.

Figure 10:
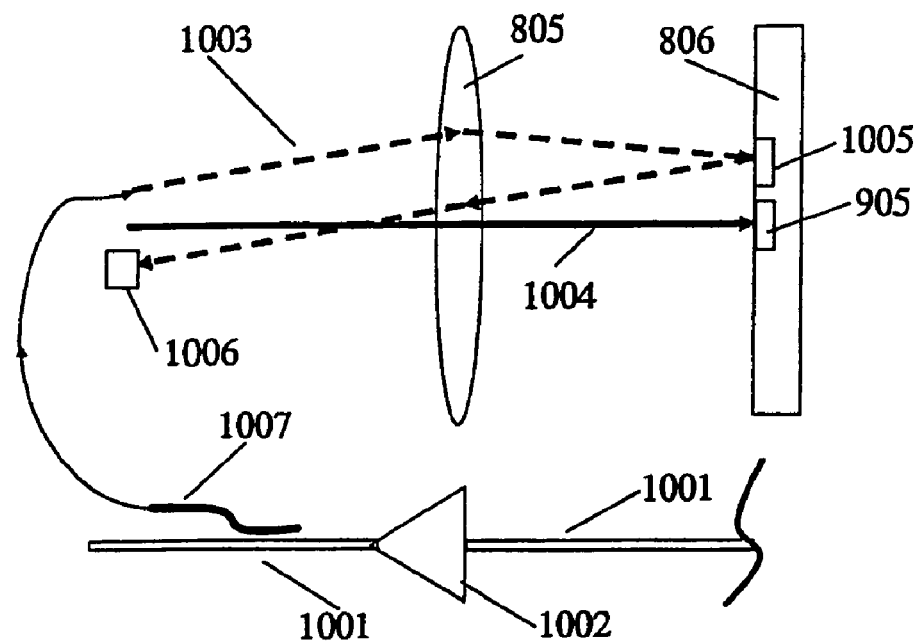
FIG. 10 shows a third device using wavefront sensing to monitor a beam.

In a third method (FIG. 10) a monitor tap 1007 in the output fibre 1001, possibly after an optical amplifier 1002, is used to extract a weak copy of the routed beams after they have been routed through the optical system. This weak copy may be injected back into that optical system to create a weak beam 1003 at an angle to the main input beam 1004, so that the copy arrives at a separate row of pixel blocks 1005, where flashing pixels are used to sense the beams. These beams may be routed or specularly reflected, as desired, to a receiving element 1006.

For all three methods, control circuitry 817 is used to control and select the flashing pixels so as to create flashing pixel fields with known and desirable time dependence. This time dependence could include sequential polling of the different wavelength channels routed to that output fibre, or continuous signals containing orthogonal codes, or continuous signals containing frequency tones at known but disjoint frequencies. The difference signals may be processed in the signal processing circuitry 815 to identify which wavelength channels are present. For example if sequential polling has been used, the presence of difference signals during the time period for which the SLM is expected to respond to the flash applied to the pixel block assigned to that channel indicates the presence of the channel, while the absence of such a signal indicates that the channel is unoccupied. This method enables periodic checks on the channel occupancy but has the drawback that there is a delay of one cycle time (through all polled channels) before it is possible to know that a channel has become unoccupied. Further, two flashes are required to measure each channel.

Frequency tones in the difference signal may be detected with a set of filters. The presence of the tone indicates the presence of the channel, while the absence of such a tone indicates that the channel is unoccupied. The advantage of the frequency tone method is that the monitor signal for a particular channel is then continuous, reducing the time to detect that the channel has become unoccupied.

As well as indicating occupancy, the strength of the difference signal can indicate the relative power level in the channel for use in control algorithms to adjust the channel equalisation. Small changes in the position of the flashing pixels may be applied to confirm the positions of the centres of the beams as they reach the SLM, and the assignment of pixel blocks to each channel adjusted accordingly.

The strength of the difference signal may be increased by flashing more than one pixel in the same column. Adjacent columns may also be flashed if required to further increase the difference signal.

Figure 11:
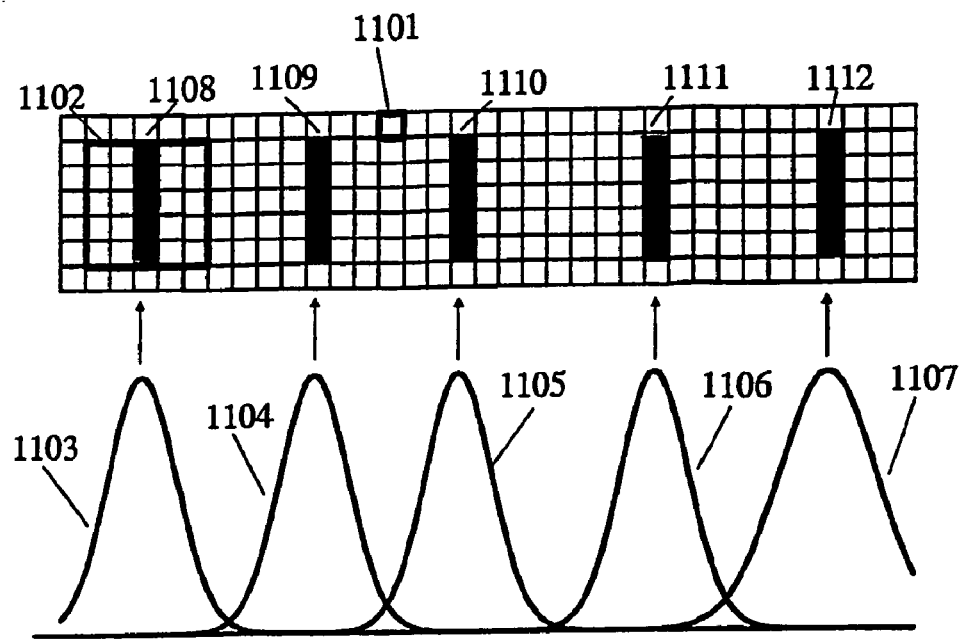
FIG. 11 is a diagram showing one technique for increasing a difference signal.

FIG. 11 shows a set of beams 1103 to 1107 incident on a 2D array of pixels. Each beam carries the signal in a wavelength channel. 1101 is an individual pixel and 1102 is a block of pixels assigned to a particular beam. In the figure, columns of pixels 1108 to 1112 in each assigned block are used to sense each individual beam. Further, the positions of the flashing pixels across the row of pixel blocks may be considered as a comb. The relative position of the comb compared to the incident beams 1103 to 1107 may be adjusted slowly back and forth to detect changes in the relative wavelength spacing between channels, and thus indicate if a channel has drifted, as has the channel creating beam 1105.

While the aforementioned monitoring applications have used the measured amplitude distributions to extract information about the signals passing through the system, the wavefront sensing technique described herein may also detect phase distributions, as described earlier, and the distribution processed to calculate angle of incidence and defocus. In an adaptive optical system this information may be used to control the alignment of the optical beams passing through the system.

Figure 12:
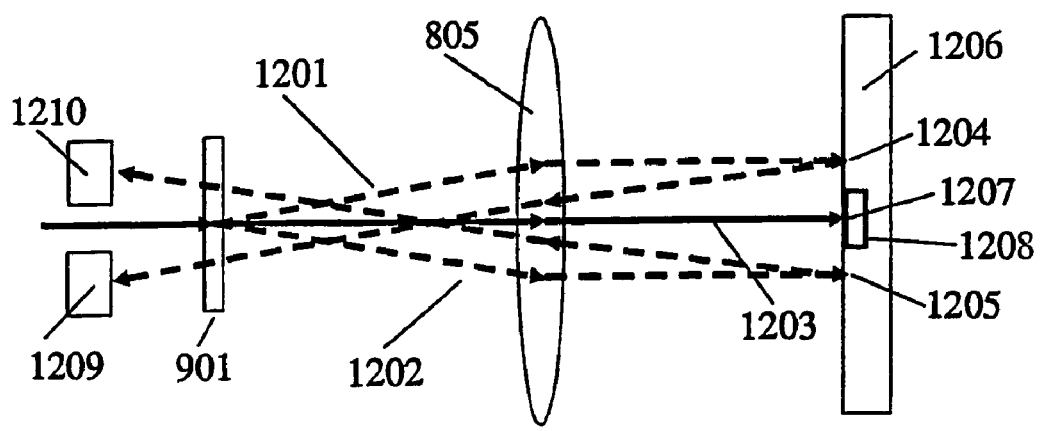
FIG. 12 shows a device having free space taps.

Some free space taps (FIG. 12) will create two copies 1201, 1202 of the input beams. Preferably these should be at equal angles but on opposite sides of the main input beams 1203. The positions 1204, 1205 where these copies of the input beams arrive at the SLM 1206 may be measured as discussed under alignment techniques. Interpolation may be applied to calculate the position 1207 where the main input beams 1203 are incident on the SLM, and the assignment of pixel blocks 1208 to these main input beams adjusted without creating difference signals on top of the data. These two copies 1201, 1202 of the input beam may have the same or different distributions of flashing pixels applied. Further the phase perturbation applied at the flashing pixels may be the same or different. The two reflected and sensed copy beams may pass back through the free-space tap 901 to separate receiving elements 1209 and 1210.

It may be advantageous to use more than one receiving element for wavefront sensing or monitoring applications. A first example is to allocate the wavelength channels to a set of groups, with each group of channels monitored at a particular receiving element.

Preferably the receiving elements are positioned and the copy beams angled such that the field generated by the flashing pixel(s) does not create significant difference signals on top of the data in the main output beams, if that is undesirable.

A second example is to monitor two channels at the same nominal wavelength in a system where they are incident on the same pixel block. Generally these two channels would be incident at different angles, so when specularly reflected or deflected with the same routing hologram would be incident on different receiving elements. A first receiving element should be positioned to receive a significant fraction of the beam from the first channel, but an insignificant fraction of the beam from the second channel. Hence the difference signal from this first receiving element is not influenced by the power in the second channel, and may be processed to monitor this first channel without the monitor signal being corrupted by the second channel incident on the same pixel block Similarly for monitoring the second channel at a second receiving element.

It is possible to perform the invention with embodiments using either multiphase or binary phase SLMs. Multiphase pixelated SLMs may incorporate an integral or non-integral quarter-wave plate or a wave plate having a similar effect to provide polarisation insensitivity where a liquid crystal having out of plane tilt is used.

In a family of embodiments the SLM is treated as divided into blocks, with each block associated with a respective receiving element and displaying a respective hologram to route light to the receiving element.

Although the aforegoing description discusses Fourier systems, the invention is equally applicable to Fresnel systems which are likewise linear and for which the field generated by the flashing pixel may be considered slowly varying across the receiving element. In practice this means that the field generated by the flashing pixel across the receiving element varies as slowly or more slowly than the field created at the receiving element by the original hologram, $H_0(u,v)$.

The above description refers to LCOS SLMs. However the invention is not so limited but instead extends to the full scope of the appended claims.

The invention claimed is:

1. Apparatus for characterising a spatially coherent beam of light, comprising:
   a LCOS SLM arranged so that a said beam of light can be incident upon it;
   means for causing the LCOS SLM to display a first hologram pattern;
   means for causing the LCDS SLM to display a second hologram pattern at a location in said beam where the amplitude and phase of the beam are to be characterised;
   means for changing the second hologram pattern displayed on the LCDOS SLM; and
   means for measuring an intensity of light to determine the effect of said change of hologram pattern.

2. Apparatus as claimed in claim 1, wherein the means for measuring is disposed in the Fourier plane to detect the Fourier output.

3. Apparatus as claimed in claim 1, further comprising a lens for providing the Fourier output.

4. Apparatus as claimed in claim 1, further comprising a mirror for providing the Fourier output.

5. Apparatus according to claim 1 further comprising:
   means for changing the first hologram pattern displayed on the SLM to a third hologram pattern, outside the location in said beam where the amplitude and phase are to be characterised; and
   means for measuring an intensity of light to determine the effect of said change in hologram pattern.

6. A method for alignment of an optical system by use of a Spatial Light Modulator, SLM, the SLM having phase modulating elements, the method comprising:
   a. rendering a beam incident on the SLM;
   b. measuring the transverse phase and/or amplitude distribution of the beam on the SLM by varying a displayed phase distribution of the phase modulating elements; and
   c. performing relative movement between the beam and the SLM to achieve a desired alignment of a feature of the beam with respect to the SLM.

7. The method of claim 6 wherein:
   the optical system comprises a further optical component; and the method further comprises:
   d. adjusting the further optical component to move the position of a feature of the beam incident on the SLM towards a desired position on the SLM.

8. The method of claim 7 further comprising:
   repeating the method steps a., b., c. and d. until the feature of the beam is incident on the SLM at the desired position.

9. The method of claim 7, wherein the step of adjusting the relative position between the SLM and the beam towards a desired position comprises adjusting the relative transverse position of the SLM with respect to the beam.

10. The method of claim 7, wherein the step of adjusting the relative position between the SLM and beam towards a desired position comprises adjusting the relative longitudinal position of the SLM relative to the beam.

11. The method of claim 10, wherein the beam has a symmetric phase distribution or a symmetric amplitude distribution.

12. The method of claim 11, wherein the beam is Gaussian.

13. The method of claim 12, wherein the beam is asymmetric.

14. The method of claim 6 further comprising:
   d. adjusting the relative position between the SLM and the beam to move the position of a feature of the beam incident on the SLM towards a desired position on the SLM.

15. The method of claim 14 further comprising repeating the method steps a., b., c. and d. until the feature of the beam is incident on the SLM at the desired position.

16. The method of claim 6, further comprising assigning or re-assigning a block of pixels to the or each beam.

17. The method of claim 6, wherein the optical system further comprises a dispersive element such that different component wavelengths of the beam are incident on different portions of the SLM.

18. The method of claim 6, wherein the known feature of the beam is: the centre of the beam, an edge of the beam, a phase feature, or an amplitude feature.

19. The method of claim 6, wherein the comparison comprises: data fitting, centroiding, or feature extraction.

20. A method according to claim 6, further comprising:
   d. rendering at least one further beam incident on the SLM;
   e. measuring the phase and/or amplitude distribution of the or each further beam on the SLM by varying a displayed phase distribution of the phase modulating elements; and
   f. performing said relative movement between the beam and the SLM to achieve a desired alignment of a feature of the beam and the or each further beam with respect to the SLM.

21. A method of measuring transverse amplitude and phase variations in a spatially coherent beam of light comprising:
   a. causing the beam to be incident upon a spatial array displaying a pixellated first phase distribution, in a measuring region of said spatial array;
   b. causing the phase distribution to change to a new value while retaining the first phase distribution outside the measuring region, in the Fourier plane;
   c. determining the intensity resulting from the first change in phase distribution, outside the measuring region applying a second change in phase distribution, in the Fourier plane; and
   d. determining the intensity resulting from the second change on phase distribution.

* * * * *